United States Patent [19]

Sakamoto et al.

[11] Patent Number: 5,849,073
[45] Date of Patent: Dec. 15, 1998

[54] PIGMENT FOR SENSING GAS LEAKAGE AND PROCESS FOR PRODUCING THE SAME

[75] Inventors: Masashi Sakamoto; Haruo Okuda, both of Yokkaichi; Hideo Futamata, Tsu, all of Japan

[73] Assignees: Ishihara Sangyo Kaisha, Ltd., Osaka; Act Research, Inc., Mie-ken, both of Japan

[21] Appl. No.: 25,338

[22] Filed: Feb. 18, 1998

Related U.S. Application Data

[63] Continuation-in-part of Ser. No. 358,982, Dec. 19, 1994, abandoned, which is a continuation of Ser. No. 205,360, Mar. 3, 1994, abandoned, which is a continuation of Ser. No. 959,450, Oct. 13, 1992, abandoned.

[30] Foreign Application Priority Data

Oct. 14, 1991 [JP] Japan ..................................... 3-293604
Oct. 14, 1991 [JP] Japan ..................................... 3-293605

[51] Int. Cl.$^6$ ....................................................... C09C 1/36
[52] U.S. Cl. .......................... 106/437; 106/440; 106/442; 48/193; 252/68
[58] Field of Search ................................... 106/437, 440, 106/442

[56] References Cited

FOREIGN PATENT DOCUMENTS 52-104283 9/1977 Japan .
57-57977 12/1982 Japan .
63-296842 12/1988 Japan .

OTHER PUBLICATIONS

Patent Abstracts of Japan vol. 13, No. 134 (C–581) 4 Apr. 1989 & JP–A–63–296–842 (Tanaka Kikinzoku) 2 Dec. 1988.

Database WPIL, Section Ch, Week 9246, Derwent Publications Ltd., London, GB; AN 92–378269 & JP–A–4 279 681 (Akuto Res. and Chubu Denryoku) 5 Oct. 1992.

Patent Abstracts of Japan vol. 15, No. 256 (C–845) 28 Jun. 1991 & JP–A–30 84 066 (Toray Ind.) 9 Apr. 1991.

Database WPI, Section Ch, Week 7741, Derwent Publications Ltd., London GB; AN 77–73404Y & JP–A–52 104 283 (Kawasaki Jukogyo) 1 Sep. 1987.

*Primary Examiner*—Mark L. Bell
*Assistant Examiner*—Scott L. Hertzog
*Attorney, Agent, or Firm*—Cushman, Darby & Cushman, IP Group of Pillsbury, Madison & Sutro, LLP

[57] ABSTRACT

A pigment for sensing gas leakage can be produced by adding at least one of salts of platinum group metals to a slurry of particulate substrate, neutralizing the resultant mixture to deposit at least one of oxides, hydroxides and hydrated oxides of platinum group metals on the surfaces of said particulate substrate, and if necessary, further adding to said slurry at least one of compounds of aluminum, silicon, titanium, zinc, zirconium, tin, antimony and cerium, neutralizing the resultant mixture to deposit at least one of compounds such as oxides, hydroxides and hydrated oxides of aluminum, silicon, titanium, zinc, zirconium, tin, antimony and cerium, on the particles. The pigment for sensing gas leakage allows any combustible gas such as hydrogen, carbon monoxide, acetylene, methane and the like leaking from chemical reaction apparatuses and various factories using reducing gases to be definitely and conveniently detected by applying the pigment onto the surfaces of the outer walls and pipes of chemical reaction apparatuses as well as the surfaces of the rooms of the factories.

19 Claims, 3 Drawing Sheets

THE DIFFERENCE OF BASE MATERIAL BETWEEN $TiO_2$ AND $Al_2O_3$ ON HYDROGEN DETECTION ABILITY

THE DIFFERENCE OF BASE MATERIAL BETWEEN $TiO_2$ AND $Al_2O_3$ ON HYDROGEN DETECTION ABILITY

THE DIFFERENCE OF BASE MATERIAL BETWEEN $TiO_2$ AND $Al_2O_3$ ON HYDROGEN ABILITY

THE DIFFERENCE OF BASE MATERIAL BETWEEN $TiO_2$ AND $Al_2O_3$ ON HYDROGEN DETECTION ABILITY

PIGMENT FOR SENSING GAS LEAKAGE AND PROCESS FOR PRODUCING THE SAME

This is a continuation-in-part of U.S. patent application Ser. No. 08/358,982, filed Dec. 19, 1994 (now abandoned), which is a continuation of application Ser. No. 08/205,360, filed Mar. 3, 1994 (abandoned), which is a continuation of application Ser. No. 07/959,450, filed Oct. 13, 1992 (abandoned).

BACKGROUND OF THE INVENTION

1. Field of the Invention

The present invention relates to a pigment for sensing gas leakage from a chemical reaction apparatus by color change of the pigment, and more particularly, to a pigment for sensing gas leakage comprising a particulate substrate having thereon at least one selected from the group consisting of platinum group metal oxides, hydroxides and hydrated oxides, and a process for producing the same.

2. Description of Related Art

Gases such as hydrogen, carbon monoxide, and the like have been widely used in industry. There is generally a continuous danger of gas leakage from chemical reaction apparatuses using or making the gases owing to a higher kinetic energy possessed by the gases compared to those of liquids or solids. Particularly, hydrogen is a gas having the highest molecular kinetic velocity and the highest diffusibility so that it is liable to leak resulting in formation of a mixture of the hydrogen and the oxygen from air, forming a so-called detonating gas which can cause a vigorous explosive reaction accompanying sometimes with destruction of chemical reaction apparatuses or disaster to workers.

There have been employed various means for sensing gas leakage from the chemical reaction apparatuses such as (1) a method of locating a site causing gas leakage by disposing many manometers at various parts of gas passing devices in the chemical reaction apparatuses such as gas inlet pipes; reaction vessels, gas outlet pipes and the like, and detecting a variation in pressure indicated with the manometers, and (2) a method comprising the use of a sensing sheet impregnated with palladium oxide hydrate as disclosed in Japanese Patent Publication (Post-Exam.) 57-57977.

However, the method (1) has disadvantages in that the variation in gas pressure may be occasionally attributed to cloggings with reactants in the reaction apparatus rather than gas leakage, that existence and location of gas leakage are not precisely detected, and that slight leakage from cracks and fine pits generated due to deterioration of structural materials of the apparatus can not be detected. Similarly, the method (2) has not a few problems to be overcome in that gas leaking sites can not be located unless laborious work is necessary, that slight leakage is difficult to locate, and that the method is unsatisfactory for continuously monitoring gas leakage.

SUMMARY OF THE INVENTION

It is an object of the present invention to provide a pigment for sensing gas leakage comprising a particulate substrate having at least one selected from the group consisting of oxides, hydroxides and hydrated oxides of platinum group metals deposited thereon.

It is another object of the present invention to provide a process for producing the aforementioned pigment for sensing gas leakage.

BRIEF DESCRIPTION OF THE DRAWINGS

Further objects and advantages of the present invention will be better understood by carefully reading the following detailed description of the presently preferred exemplary embodiments of this invention in conjunction with the accompanying drawings, of which.

DETAILED DESCRIPTION OF PREFERRED EMBODIMENTS

Figure 1:
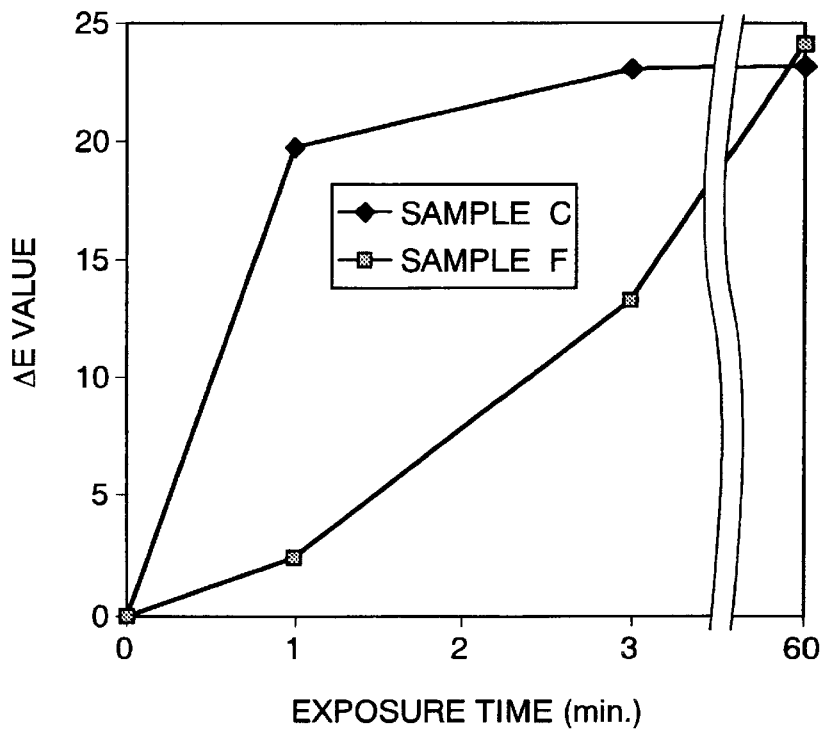
FIG. 1 shows the calculations of $\Delta E$ for Sample C and Sample F, from Test-1 of Example 14.

We have performed research on a process for sensing precisely and conveniently a leakage of combustible gases such as hydrogen, carbon monoxide, acetylene, methane, and the like from chemical reaction apparatuses. As a result, we have found that existence and locations of gas leakage can be detected by applying a coating formulation containing pigment particles having a compound of a platinum group metal on the surface thereof, instead of ordinary paints, onto the surfaces of outer walls and conduits of the chemical reaction apparatus and observing any color change of the coating caused only at a location of gas leakage. It has been further found that the pigment particles having the platinum group metal compound and a specific compound other than the platinum group metal compound on the surface thereof are improved in weatherability or dispersibility. That is, the present invention provides (1) a pigment for sensing gas leakage comprising titanium dioxide particles having at least one selected from the group consisting of oxides, hydroxides and hydrated oxides of platinum group metals (referred to as platinum group compounds hereinafter) present on the surface thereof, and (2) a pigment for sensing gas leakage comprising titanium dioxide particles having at least one of platinum group compounds present on the surface thereof, and in addition, having at least one selected from the group consisting of oxides, hydroxides and hydrated oxides of aluminum, silicon, titanium, zinc, zirconium, tin, antimony and cerium (referred to as a surface coating agent) present on the surface thereof.

The pigment for sensing the gas leakage according to the present invention is such that (1) at least one of the platinum group compounds is present on the surface of titanium dioxide particles and that (2) at least one of the platinum group compounds is present, and in addition, at least one of the surface coating agents is also present on the surface of titanium dioxide particles. The pigments are discolored to blackish color by reacting with leaked reducing gases. The term "present" as used herein means that the platinum group compounds and the surface coating agents are coated, deposited, or precipitated on, or supported on, or adhering to directly or indirectly all or part of the surface of substrate particles. The platinum group metals include palladium, platinum, rhodium, and the like classified as the platinum group, at least one of the compounds of which is present on the substrate particles. From the aforementioned platinum group compounds, suitable one to be practically used can be selected depending upon a gas to be detected. However, oxides, hydroxides and hydrated oxides of palladium are preferred because of their shorter response time and higher degree of color change. Most preferred are hydroxides and hydrated oxides of palladium. The substrate particles to be used in the present invention are titanium dioxide particles having an average particle size of 0.01 to 0.5 $\mu$m, most preferably those having an average particle size of 0.1 to 0.3 $\mu$m which are excellent in hiding power. The use of the titanium dioxide particles enables white pigments having a higher gas sensing ability and excellent white pigment characteristics to be produced. Titanium dioxide provides a faster and more sensitive reaction in conjunction with a platinum group metal, such as palladium. Thus, the titanium dioxide particles enable faster and more sensitive detection of hydrogen. The platinum group compounds such as those of palladium, platinum, rhodium and the like may be present on the aforementioned substrate particles in the form of even or uneven coating or adhered film on or near the all or part of the surfaces of the particles. In the present invention, palladium of the platinum group metals is preferred particularly when used in a hydrated oxide form, because it is easily reducible and highly reactive with a reducing gas. Alternatively, the platinum group compounds having a finer particle size than those of the substrate particles may be deposited, precipitated, or supported directly on or indirectly near the surfaces of the substrate particles. The platinum group compounds are applied in an amount of 0.5 to 10% by weight, preferably 1 to 5% by weight as expressed by the platinum group metal oxide based on the weight of the substrate. An amount of the compounds lower than 0.5% by weight may cause insufficient color change to detect gas leakage, while an amount of higher than 10% by weight is uneconomical with no further improvement in the sensing function being expected.

One embodiment of the pigment according to the present invention comprises titanium dioxide particles having at least one of the platinum group compounds present on the surface thereof. Another embodiment according to the present invention comprises titanium dioxide particles having at least one of the platinum group compounds present on the surface thereof, on which further at least one of the surface coating agents is present. In the latter case, the pigments have an improved weatherability and an improved dispersibility at formulating paints, and even when they are applied onto outer walls of outdoor-disposed chemical reaction apparatuses, they exhibit less deterioration of coating films and less reduction in sensing ability allowing the safety of the chemical reaction apparatus to be maintained for a prolonged period of time. The amount of the surface coating agents to be used is 1 to 10% by weight, preferably 1 to 5% by weight in total weight of oxides in the surface coating agents based on the weight of the substrate particles. An amount of lower than 1% by weight leads to insufficient improvement in effects such as dispersibility and the like, while an amount of higher than 10% by weight is not expected to afford further improvement in the aforementioned effects.

The pigments for sensing gas leakage can be produced by depositing the platinum group metal compounds on the surfaces of the substrate particles (a first coating step), and then, if necessary, depositing the surface coating agents on the surface (a second coating step). The first and second coating steps may be conducted by (1) a method where substrate particles are mixed with a powder or a solution of one or more of metal compounds such as platinum group metal salts and compounds of aluminum, silicon, titanium, zinc, zirconium, tin, antimony, cerium, and the like, or dispersed in the solution, or by (2) a method where a powder or a solution of one or more of metal compounds such as platinum group metal salts and compounds of aluminum, silicon, titanium, zinc, zirconium, tin, antimony, cerium, and the like, is added to a slurry of substrate particles, followed by hydrolysis, or by (3) a method where the solution of the metal compounds as in above (2) is added to the slurry of substrate particles, and thereafter neutralized. Especially, the aforementioned method (3) employing neutralization is preferred because it enables uniform deposition of the platinum group compounds and the surface coating agents on the surfaces of the substrate particles.

The platinum group metal salts include, for example, platinum group metal chlorides, sulfates, nitrates, acetates and the like, and may be used in the form of a solution in water or an acidic solution produced by adding an acid to the aqueous solution as desired.

In the present invention, the aforementioned method (3) using neutralization consists of (a) the steps of adding the platinum group metal salts to a slurry of the substrate particles, and then neutralizing the resulting mixture with an alkali or an acid being added, or (b) the steps of adding the platinum group metal salts and an alkali or an acid to a slurry of the substrate particles while maintaining the pH of the slurry from 3 to 11, preferably from 6 to 11 specifically in case mineral acid salts of the platinum group metals are used, most preferably from 8 to 11, to neutralize the mixture, or (c) the steps of premixing a slurry of the substrate particles with a higher amount of an alkali or an acid than required to neutralize the platinum group metal salts, and then adding a platinum group metal salt to neutralize. The method consists of the steps (b) is most preferred because it allows the fine platinum group compounds to be present more uniformly on the surfaces of the substrate particles with a lower amount of the platinum group compounds required to be used. The alkalis to be used for the neutralization include sodium hydroxide, potassium hydroxide, sodium carbonate, and ammonia. The acids to be used include hydrochloric acid, sulfuric acid, nitric acid, and acetic acid. The temperature for the neutralization reaction is suitably in the range of 50° to 90° C.

The second coating step according to the present invention is generally performed as follows: Either to the slurry of the substrate particles treated with the platinum group metal compounds as mentioned above, or another slurry obtained by separating solids from the slurry prepared above and, if necessary, dried and/or heating the solids at a temperature of 250° to 600° C., and then dispersing the solids, is added at least one of aqueous solutions of inorganic salts of metals such as aluminum, silicon, titanium, zinc, zirconium, tin, antimony, and cerium, followed by neutralization with an alkali or an acid controlling the temperature higher than 50° C. The water-soluble inorganic salts include, for example, aluminum sulfate, aluminum chloride, sodium aluminate, sodium silicate, potassium silicate, titanium sulfate, titanium tetrachloride, zinc sulfate, zinc nitrate, zirconium oxychloride, zirconium chloride, zirconium sulfate, zirconyl sulfate, zirconium nitrate, stannous chloride, stannic chloride, sodium stannate, antimony bichloride, cerium nitrate, cerium ammonium nitrate, and cerium sulfate. Although the neutralizing process may be conducted by steps according to those (a), (b), or (c) as described above, preferred procedure is to effect the neutralization by adding the aforementioned solution of water-soluble inorganic salts and an alkali or an acid while maintaining the pH of the slurry of the substrate particles from 4 to 10 as in the above steps (b). The alkalis or acids to be used for neutralizing agents include those listed above.

The pigments, on which the platinum group compounds, or in addition the surface coating agents have been present, are separated as by filtration, and if necessary, washed and then dried. The resultant dry product may be heated at a temperature in the range of 250° to 600° C. to enhance desirably its color changing ability for sensing gas.

The pigments for sensing gas leakage obtained as described above according to the present invention are milled with any means for powdering them, and then mixed with a resin to produce a paint composition, which is used by applying to the surfaces of the outer walls and conduits of the chemical reaction apparatuses. Milling means include gas stream mills such as a jet mill, impact crushers such as a pulverizer, compression mills such as a ball mill. As paint ingredients for preparing a paint including the thus obtained pigment for sensing gas leakage according to the present invention, may be used various materials: as a coating film-forming agent, natural resins such as shellac or copal; modified resins such as rosin esters; synthetic resins such as phenolic resin, urea resin, melamine resin, phthalic resin, acrylic resin, epoxy resin, vinyl resin, urethane resin, alkyd resin or polyester resin; cellulose derivatives such as acetyl cellulose; rubber derivatives such as chlorinated rubber, cyclized rubber or synthetic rubber; and water-soluble compounds such as polyvinyl alcohol, casein or carboxymethyl cellulose. Of these materials are preferred acrylic resin and phthalic resin.

Furthermore, as other additives to improve dispersion of the pigment or drying, curing or properties of paint films, may be used various known materials: a drying promoter such as lead naphthenate, manganese naphthenate or cobalt naphthenate; a curing agent and a plasticizing agent such as dibutyl phthalate or castor oil; a dispersing agent such as various surfactants or lecithin; an emulsifying agent and rust-inhibiting agent such as zinc chromate; an anti-skinning agent such as methylethylketoxime or phenols; and/or a thickening agent. Still other pigments may be incorporated in the paint if they do not damage the ability of changing the color of the pigment for sensing gas leakage according to the present invention. Known solvents or dispersants such as mineral spirits, xylene or toluene are suitable for the coating film-forming agent used herein.

The amount of the pigments for sensing gas leakage according to the present invention is normally 5 to 70% by weight, preferably 10 to 60% by weight, more preferably 20 to 50% by weight, based on the resin solid of the paint.

The pigments for sensing gas leakage according to the present invention can detect precisely and conveniently the leakage of combustible gases such as hydrogen, carbon monoxide, acetylene, methane, and the like, by applying in the form of paints to the surfaces of the outer walls and conduits of chemical reaction apparatuses, the surfaces of interior walls of various factories using reducing gases. The pigment for sensing gas leakage according to the present invention comprise titanium dioxide particles having a finely divided platinum group metal compound uniformly carried on the surface thereof. Particularly, the pigment of the present invention is featured by exhibiting a degree of color change, $\Delta E$, of not less than 15, one or earlier after contact of said pigment with the reducing gas.

Therefore, they can be produced with low cost and extremely useful in industry since the amount of the expensive platinum group compounds can be lowered by allowing at least one of the platinum group compounds to be present on the surfaces of the substrate particles. Moreover, the existence of the surface coating agents on the substrate particles having at least one of the platinum group compounds present thereon can improve the weatherability of the pigments without impairing the gas sensing ability. Therefore, the pigments for sensing gas leakage of the present invention are extremely useful as those applicable to the surfaces of the pipes and the conduits of specifically outdoor disposed chemical reaction apparatuses and those under pressure and at high temperatures.

The present invention will be illustrated below with reference to some Examples.

EXAMPLE 1

Titanium dioxide particles produced by a chloride process having an average particle size of about 0.25 $\mu$m were dispersed into water, wet milled, and classified to produce a slurry containing a concentration by weight of $TiO_2$ of 100 g/l, which slurry was heated to a temperature of 70° C. and adjusted by adding an 12N aqueous solution of sodium hydroxide to a pH of 10 to 11.

Then, 2.5 g of palladium chloride and 25 g of a 36% hydrochloric acid were added into 100 ml of water to produce a solution of palladium chloride. The solution of palladium chloride and a 12N aqueous solution of sodium hydroxide were added in small portions to one liter of the slurry as described above while maintaining the pH thereof in the range of 10 to 11, followed by adding with a 3N hydrochloric acid to adjust the pH of the slurry to 8. Thereafter the stirring was continued for 60 minutes to deposit hydrated palladium oxide onto the surfaces of titanium dioxide particles. The thus produced product was filtered, washed, and dried at a temperature of 110° C. to give a pigment for sensing gas leakage of the present invention (Sample A). This Sample A was comprised of titanium dioxide particles having 1.7% by weight of the particles of hydrated palladium oxide deposited thereon. The hydrated palladium oxide was expressed as PdO.

EXAMPLE 2

A pigment for sensing gas leakage of the present invention (Sample B) was prepared in identical procedure to that in Example 1, except that the Sample A obtained in Example 1 was heated at a temperature of 500° C.

EXAMPLE 3

A pigment for sensing gas leakage of the present invention (Sample C) was prepared in identical procedure to that in Example 1, except that a solution of palladium chloride having a composition of 5 g of palladium chloride, 50 g of a 36% hydrochloric acid and 200 ml of water was employed. This Sample C was comprised of titanium dioxide particles having 3.4% by weight of the particles of hydrated palladium oxide deposited thereon.

EXAMPLE 4

A pigment for sensing gas leakage of the present invention (Sample D) was prepared in identical procedure to that in Example 1, except that the solution of palladium chloride was added while maintaining the pH of the slurry in the range of 6 to 8.

EXAMPLE 5

Titanium dioxide particles produced by a sulfate process having an average particle size of about 0.23 $\mu$m were dispersed in water, wet milled, and classified to produce a slurry containing a concentration by weight of $TiO_2$ of 100 g/l, which slurry was heated to a temperature of 70° C.

Then, 2.5 g of palladium chloride and 25 g of a 36% hydrochloric acid were added into 100 ml of water to produce a solution of palladium chloride which was added in small portions to one liter of the aforementioned slurry, followed by adding a 12N aqueous solution of sodium hydroxide to adjust the pH of the slurry to 7. Thereafter the stirring was continued for 60 minutes to deposit hydrated palladium oxide onto the surfaces of titanium dioxide particles. The thus produced product was filtered, washed, dried at a temperature of 110° C., and then heated at a temperature of 500° C. to give a pigment for sensing the gas leakage of the present invention (Sample E). On the titanium dioxide particles of this Sample E, there was deposited a palladium compound in the form of hydrated palladium oxide in an amount of 1.7% by weight of the particles of hydrated palladium oxide expressed as PdO based on the weight of titanium dioxide.

EXAMPLE 6

Titanium dioxide particles having an average particle size of about 0.25 μm produced by a chloride process were placed into water, wet ground, and classified to produce a slurry containing a concentration by weight of $TiO_2$ of 100 g/l, which slurry was heated to a temperature of 70° C. Then, 5 g of palladium chloride and 50 g of a 36% hydrochloric acid were added into 200 ml of water to produce a solution of palladium chloride which was added in small portions to one liter of the slurry as described above, followed by adding a 12N aqueous solution of sodium hydroxide to adjust the pH of the slurry to 8. Thereafter the stirring was continued for 60 minutes to deposit hydrated palladium oxide onto the surfaces of titanium dioxide particles.

Then, 8 ml of a solution of sodium silicate having a concentration of 100 g/l expressed as $SiO_2$ by weight and a 12N sulfuric acid were added to the slurry while maintaining the pH thereof in the range of 6 to 8. This was followed by adding with 30 ml of a solution of sodium aluminate having a concentration of 100 g/l expressed as $Al_2O_3$ by weight and a 12N sulfuric acid while maintaining the pH of the slurry in the range of 6 to 8. Thereafter the stirring was continued for 60 minutes. The thus produced product was filtered, washed, and dried at a temperature of 110° C. to give a pigment for sensing gas leakage of the present invention (Sample F). This Sample F had 3.4% by weight hydrated palladium oxide expressed as PdO based on the weight of titanium dioxide deposited on the particles.

EXAMPLE 7

A pigment for sensing gas leakage (Sample G) was prepared in identical procedure to that in Example 6, except that the solution of sodium silicate and the sodium aluminate were not added.

EXAMPLE 8

Example 6 was repeated, except that no sodium silicate was added, to produce a product which was filtered, washed, and heated at a temperature of 500° C. to produce a pigment for sensing gas leakage of the present invention (Sample H).

EXAMPLE 9

Titanium dioxide particles having an average particle size of about 0.25 μm produced by a chlorine process were dispersed in water, wet milled, and classified to produce a slurry containing a concentration by weight of $TiO_2$ of 100 g/l, which slurry was heated to a temperature of 70° C., and its pH adjusted in the range of 10 to 11. Then, 2.5 g of palladium chloride and 25 g of a 36% hydrochloric acid were added into 100 ml of water to produce a solution of palladium chloride. The solution and a 12N aqueous solution of sodium hydroxide were added in small portions to one liter of the slurry as described above while maintaining the pH of the slurry in the range of 10 to 11. This was followed by adding a 3N hydrochloric acid to adjust the pH of the slurry to 8. Thereafter, the stirring was continued for 60 minutes to deposit hydrated palladium oxide onto the surfaces of titanium dioxide particles.

Then, 8 ml of a solution of sodium silicate having a concentration of 100 g/l expressed as $SiO_2$ by weight and a 12N sulfuric acid were added to the slurry while maintaining the pH thereof in the range of 6 to 8. This was followed by adding with 30 ml of a solution of sodium aluminate having a concentration of 100 g/l expressed as $Al_2O_3$ by weight and a 12N sulfuric acid while maintaining the pH of the slurry in the range of 6 to 8. Thereafter, the stirring was continued for 60 minutes. The thus produced product was filtered, washed, and dried at a temperature of 110° C. to give a pigment for sensing gas leakage of the present invention (Sample I). This Sample I had 1.7% by weight hydrated palladium oxide expressed as PdO based on the weight of titanium dioxide deposited on the particles.

EXAMPLE 10

A pigment for sensing gas leakage of the present invention (Sample J) was prepared by heating the Sample I obtained in Example 9 at a temperature of 500° C.

EXAMPLE 11

Example 9 was repeated, except that a solution of palladium chloride having a composition of 1.5 g palladium chloride, 15 g of a 36% hydrochloric acid and 60 ml of water was used, to produce a dry powder which was heated at a temperature of 500° C. to produce a pigment for sensing gas leakage of the present invention (Sample K). This Sample K had hydrated palladium oxide in an amount of 1.0% by weight expressed as PdO based on the weight of titanium dioxide.

EXAMPLE 12

Titanium dioxide particles were coated with hydrated palladium oxide in the same procedure as in Example 9. The treated slurry was filtered, washed, heated at a temperature of 500° C. to produce a powder, then wet milled, and classified to produce a slurry containing a concentration by weight of $TiO_2$ of 100 g/l. This slurry was heated to a temperature of 70° C., and then 8 ml of a solution of sodium silicate having a concentration of 100 g/l expressed as $SiO_2$ by weight and a 12N sulfuric acid were added to one liter of the slurry while maintaining the pH thereof in the range of 6 to 8. This was followed by adding with 30 ml of a solution of sodium aluminate having a concentration of 100 g/l expressed as $Al_2O_3$ by weight and a 12N sulfuric acid while maintaining the pH of the slurry in the range of 6 to 8. Thereafter the stirring was continued for 60 minutes. The thus produced product was filtered, washed, and dried at a temperature of 110° C. to give a pigment for sensing gas leakage of the present invention (Sample L).

EXAMPLE 13

A pigment for sensing the gas leakage (Sample M) was prepared in the identical procedure to that in Example 9, except that instead of the the solution of sodium silicate, 8 ml of a solution of zirconyl sulfate having a concentration of 100 g/l expressed as $ZrO_2$ by weight were added.

EXAMPLE 14

1) Preparation of Powder Samples A to E According to the Present Invention 1-1) Preparation of Powder Sample A
(titanium dioxide particles coated with hydrated palladium oxide)

Titanium dioxide particles were produced by a chloride process. The particles, having an average particle size of about 0.25 μm, were dispersed into water, wet milled and classified to produce a slurry of 1 liter containing a concentration by weight of $TiO_2$ of 100 g/l. This slurry was heated to a temperature of 70° C. and adjusted by adding a 12N aqueous solution of sodium hydroxide to a pH of 10 to 11.

Then, 0.37 g of palladium chloride and 20 g of a 36% hydrochloric acid were added to 80 ml of water to produce a solution of palladium chloride. The solution of palladium chloride and a 12N aqueous solution of sodium hydroxide were added in small portions to one liter of the slurry described above while maintaining the pH thereof in the range of 10 to 11. This was followed by adding a 3N hydrochloric acid to adjust the pH of the slurry to 8. Thereafter, the stirring was continued for 60 minutes to deposit hydrated palladium oxide onto the surfaces of titanium dioxide particles.

The thus produced product was filtered, washed and dried at a temperature of 120° C. to give a pigment for sensing gas leakage of the present invention (Sample A). This Sample A was comprised of titanium dioxide particles having 0.25% by weight of hydrated palladium oxide deposited thereon. The hydrated palladium oxide was expressed as PdO.

1-2) Preparation of Powder Sample B

The procedures as in 1-1) above were repeated to prepare Sample B, except that 0.74 g of palladium chloride was used so that the amount of the hydrated palladium oxide deposited was 0.5% by weight of PdO.

1-3) Preparation of Powder Sample C

The procedures as in 1-1) above were repeated to prepare Sample C, except that 2.0 g of palladium chloride was used so that the amount of the hydrated palladium oxide deposited was 1.36% by weight of PdO.

1-4) Preparation of Powder Sample D

The procedures as in 1-1) above were repeated to prepare Sample D, except that 3.0 g of palladium chloride was used with the result that the amount of the hydrated palladium oxide deposited was 2.0% by weight of PdO.

1-5) Preparation of Powder Sample E

The procedures as in 1-1) above were repeated to prepare Sample E, except that 7.4 g of palladium chloride was used with the result that the amount of the hydrated palladium oxide deposited was 5.0% by weight of PdO.

2) Preparation of Comparative Powder Sample F
(aluminum oxide particles coated with hydrated palladium oxide)

The procedures as in 1-3) above were repeated to prepare Sample F, except that the titanium dioxide particles as a base were replaced with aluminum oxide particles having a particle size of 0.8–1.0 μm. The result was that 1.36% by weight of PdO was deposited on the aluminum oxide particles.

To facilitate direct comparison with the titanium dioxide particles, the dispersed states of titanium dioxide and aluminum oxide particles were essentially equal.

3) Preparation of Comparative Powder Sample G
(titanium dioxide particles coated with hydrated silver oxide)

A 350 ml volume of a 0.01N solution of silver nitrate containing 0.39% by weight of $Ag_2O$ was added to one liter of the slurry of titanium dioxide particles adjusted to a pH of 10–11 (which was used in the preparation of Sample A), under stirring for 60 minutes. Then, the resultant slurry was dried and thereafter fired at 500° C. for 3 hours to thus obtain Sample G with 1.36% by weight of $Ag_2O$ deposited thereon.

4) Preparation of Comparative Powder Sample H
(titanium dioxide particles coated with hydrated platinum oxide)

A 350 ml volume of water containing 3.5 g of $H_2PtCl_6 \cdot 6H_2O$ was added to one liter of the slurry of titanium dioxide particles adjusted to a pH of 10–11 (which was used in the preparation of Sample A), under stirring for 60 minutes. Then, additional stirring was conducted for 60 minutes. The slurry was left to stand, and a supernatant liquid was removed therefrom. The resultant cake was dried to obtain Sample H with 1.36% by weight of PtO deposited thereon.

5) Testing Method

Each 40 g of the Samples A to H obtained in Example 14 were mixed with 60 g of glass beads and 33.3 g of a resin solution of a mill base. The mill base was a mixture of 480 g of TESRACK 2150-50 (Normal dry alkyd resin, available from HITACHI Chemical Polymer Co.) and 320 g of mineral turpentine and, thereafter, shaken for 20 minutes to prepare each mill base. To 55 g of each mill base, there were added 85 g of a letdown liquid having the formulation defined below, followed by shaking in a paint shaker for 5 minutes to prepare paints. These paints were applied onto glass plates and filter paper of No. 5C, which were then dried to a dry film thickness of 50 μm.

| Formulation of Letdown Liquid | |
|---|---|
| TESRACK 2150-50 (Normal dry alkyd resin, available from HITACHI Chemical Polymer Co.) | 51.0 g |
| DISPERON 4200-20 (Dispersant, available from KUSUMOTO Chemical Co.) | 0.6 g |
| Lead naphthenate (available from DAI NIPPON INK Co.) | 2.0 g |
| Cobalt naphthenate (available from DAI NIPPON INK Co.) | 0.4 g |
| Manganese naphthenate (available from DAI NIPPON INK Co.) | 0.4 g |
| Methyl ethyl ketone oxime (available from UBE KOSAN Co.) | 0.6 g |

5-1) Hydrogen-Detecting Test-1

The colors (L value, a value and b value) of the glass plates having Sample C and Sample F respectively applied thereon (three plates for each), were measured with SUGA SM-4 Color computer (available from SUGA Shikenki Co.). Then, the Samples were placed in a 5 liter vessel at room temperature which was swept with hydrogen. Thereafter, the colors (L' value, a' value and b' value) of the glass plates after passing a flow of hydrogen for 0, 1, 3 and 60 minutes at a rate of 500 ml/minute were measured and the degree of color change (ΔE) owing to hydrogen was calculated from the equation:

$$\Delta E = \{(L-L')^2 + (a-a')^2 + (b-b')^2\}^{1/2}$$

A higher value of ΔE indicates a larger degree of color change of a formulated pigment.

5-2) Hydrogen-Detecting Test-2

Sheets of filter paper No. 5C having Samples A, B, C and F, respectively, applied thereon were set on an apparatus including a three-necked flask. The sheets were firmly adhered to the three-necked flask with an adhesive silicone, so that hydrogen gas did not leak from the portion between the sheets and the three-necked flask. 20 liters of hydrogen gas were allowed to flow through the three-necked flask. The gas of the three-necked flask was the hydrogen gas. Thereafter, the pressure of the three-necked flask was adjusted, so that the differential pressure (inner pressure–outer pressure) of the three-necked flask was 1 mmHg. An opening of 0.4 mm in diameter was made with an injector needle, through which hydrogen gas was allowed to flow, while maintaining the differential pressure of the three-necked flask at 1 mmHg. When 2 minutes, 5 minutes, 10 minutes, 20 minutes, 30 minutes and 60 minutes lapsed as counted from the time at which the opening was made, the color-changed surface area near the opening was measured.

5-3) Hydrogen-Detecting Test-3

Glass plates having Samples A, B, C, D, E, G and H respectively applied thereon, one plate for each, were exposed for 60 minutes to hydrogen gas in the same manner as in Hydrogen-Detecting Test-1 above. Thereafter, the colors before the exposure and after the exposure, respectively, were measured. The $\Delta E$ was calculated.

6) Results of Experiments 6-1) Results of Test-1

The calculations of $\Delta E$ for Sample C and Sample F are shown in FIG. 1. Furthermore, the color changes of Samples C and F on the glass plates when brought in contact with hydrogen gas for 0 minute, 1 minute, 3 minutes and 60 minutes, respectively, are shown in Table 2 and Table 3, respectively.

The color change was outstanding for Sample C with titanium dioxide base particles even in contact with hydrogen gas for only one minute. The use of titanium dioxide particles provided for faster and more sensitive detection of hydrogen. Therefore, leakage of hydrogen gas can very easily be detected. On the other hand, however, it took longer than 60 minutes until leakage of hydrogen gas could be detected when oxide particles, such as aluminum oxide particles, other than the titanium dioxide particles were used as base particles. Dangerous gases, which may cause an explosion accident, should be detected as soon as possible. Sample F having a low detecting performance is not suitable for detecting such gases.

6-2) Results of Test-2

Figure 2:
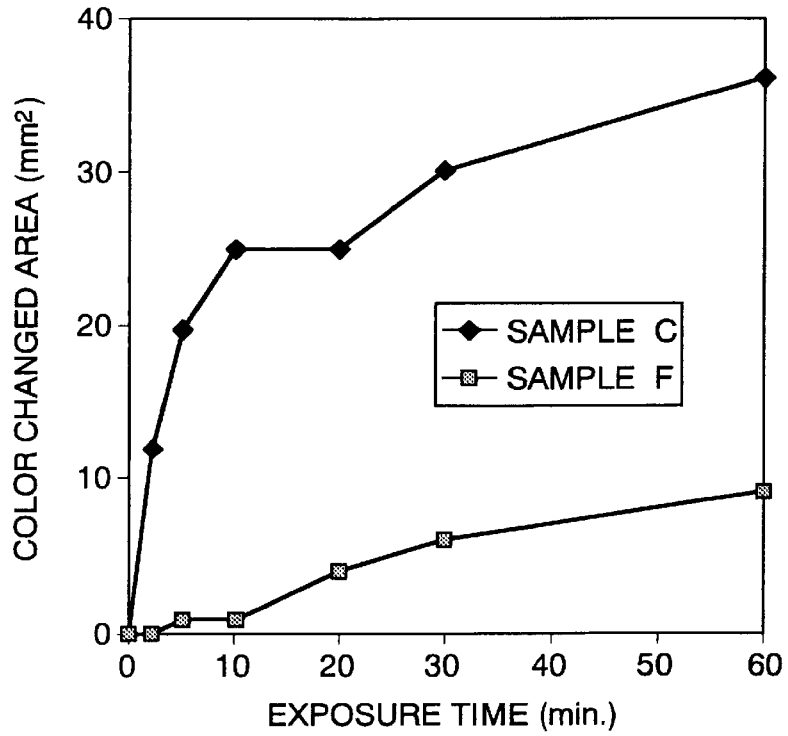
FIG. 2 shows the color-changed surface area for Sample C and Sample F, from Test-2 of Example 14.

The color-changed surface area for Sample C and Sample F are shown in FIG. 2 and Table 8. Furthermore, the color changes of Sample C and Sample F when brought in contact with hydrogen gas for 60 minutes are shown in Table 4, and the color changes of Sample A, B and C are shown in Table 5.

Sample C, of which the base particles were of titanium dioxide, had an outstanding change of color and a larger color-changed surface area when brought in contact with hydrogen gas for only one minute, and so the gas leakage could easily be detected. The use of titanium dioxide particles provided for faster and more sensitive detection of hydrogen. On the other hand, Sample F. of which the base particles were aluminum oxide, had a slight change of color and a smaller color-changed surface area even when the gas leakage continued for a period of longer than 60 minutes, and so the gas leakage was hardly detected.

Sample A coated with 0.25 wt % of PdO had a substantial area of color change but so unclear (weak) a degree of change of color that the leakage of hydrogen gas was hardly detected.

6-3) Results of Test-3

Figure 3:
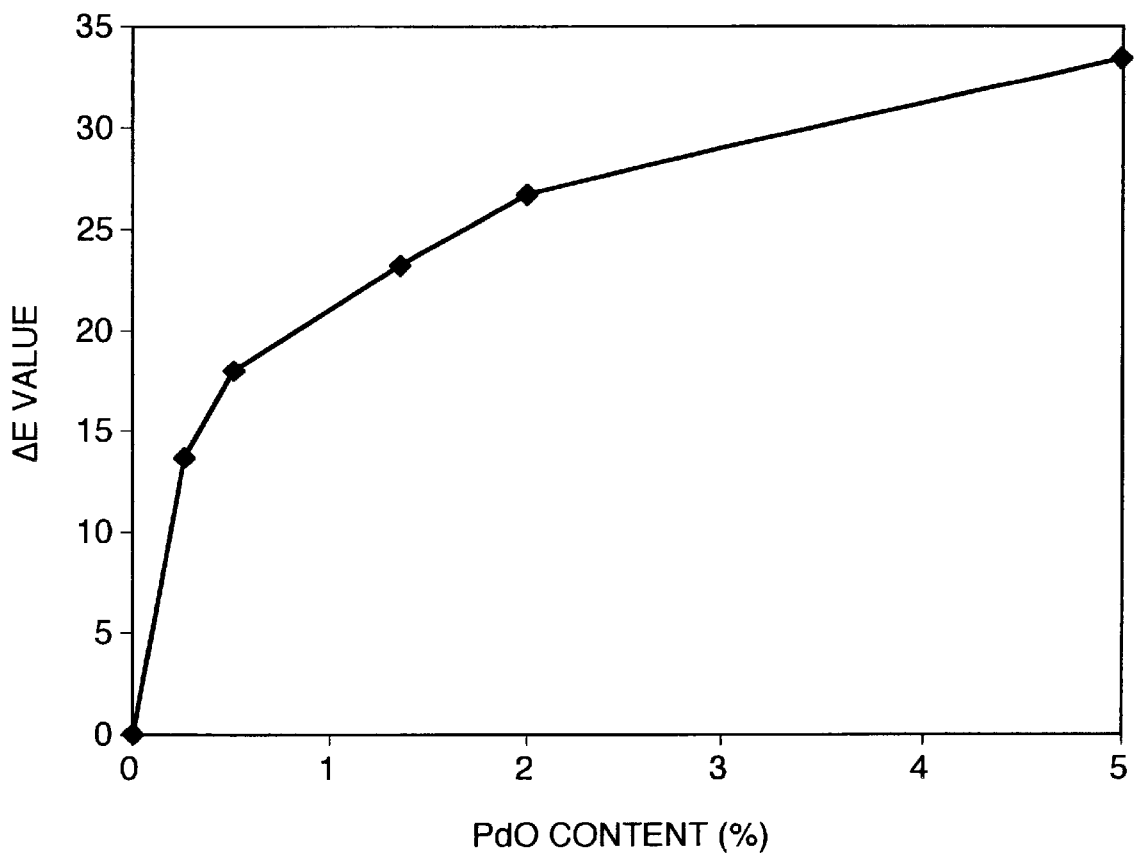
FIG. 3 shows the calculations of $\Delta E$ for Samples A, B, C, D and E, from Test-3 of Example 14.

The calculations of $\Delta E$ of the samples are shown in Table 1. Furthermore, the calculations of $\Delta E$ for Samples A, B, C, D and E are shown in FIG. 3 and Table 9. The conditions of Samples C, G and H on the glass plates when brought in contact with hydrogen gas for 60 minutes are shown in Table 6. The conditions of Samples A, B and C on the glass plates when brought in contact with hydrogen gas for 60 minutes are shown Table 7.

As is clear from the foregoing, the color change of Sample A comprising titanium dioxide base particles coated with hydrated palladium oxide in an amount of 0.25 wt % of PdO was too indefinite (weak) to detect gas leakage. On the other hand, the color change of Samples B, C, D and E comprising the same base particles coated with hydrated palladium oxide in an amount of not less than 0.5 wt % of PdO had a larger $\Delta E$ and a good hydrogen gas-leakage detecting performance. Furthermore, Sample G and Sample H coated with silver oxide and hydrated platinum oxide had a much smaller $\Delta E$ and no gas-leakage detecting performance.

TABLE 1

| Sample No. | Base | Coating species | Coated amount (%) | Colors before change | | | Colors after change | | | DE |
|---|---|---|---|---|---|---|---|---|---|---|
| | | | | L | a | b | L' | a' | b' | |
| A | $TiO_2$ | PdO | 0.25 | 85.9 | 1.3 | 8.6 | 73.6 | 0.2 | 2.4 | 13.8 |
| B | $TiO_2$ | PdO | 0.5 | 81.2 | 1.9 | 9.8 | 65.1 | 0.1 | 1.8 | 18.1 |
| C | $TiO_2$ | PdO | 1.36 | 74.1 | 1.3 | 13.6 | 55.0 | -0.2 | 0.3 | 23.3 |
| D | $TiO_2$ | PdO | 2.0 | 67.1 | 4.0 | 15.4 | 45.7 | -0.4 | -0.2 | 26.8 |
| E | $TiO_2$ | PdO | 5.0 | 51.2 | 5.4 | 19.6 | 27.0 | -0.7 | -2.8 | 33.5 |
| F | $Al_2O_3$ | PdO | 1.36 | 51.0 | 4.2 | 14.1 | 33.2 | 0.0 | -1.6 | 24.1 |
| G | $TiO_2$ | $Ag_2O$ | 1.36 | 91.4 | 0.0 | 2.3 | 91.6 | 0.0 | 2.3 | 0.2 |
| H | $TiO_2$ | PtO | 1.36 | 92.4 | -0.6 | 7.8 | 92.4 | -0.7 | 7.8 | 0.1 |

7) Observations on the above results 7-1) As is clear from FIG. 1, FIG. 2, Table 3 and Table 4, Sample C, for which the base particles were of titanium dioxide, had an outstanding color change even when brought in contact with hydrogen gas for one minute and thus an excellent gas-detecting performance. However, Sample F, for which the base particles were of other base particles than titanium dioxide, i.e., aluminum oxide particles, had so low a gas-detecting performance that it cannot be industrially used as a gas-leakage detector.

7-2) As is clear from Table 1 and Table 6, Samples G and H (for which the base particles were coated with oxides other than titanium dioxide, i.e., silver oxide and hydrated platinum oxide), had base particles of titanium dioxide, but even so had no gas-detecting performance. Thus, the use of titanium dioxide particles coated with palladium oxide is required for the most superior detection of hydrogen gas.

7-3) As is clear from Table 1, FIG. 3, Table 5 and Table 7 the amount of the hydrated palladium oxide deposited on the titanium dioxide base particles must be 0.5 wt % or more, otherwise the coated particles are of no industrial use.

TABLE 2

Sample C

| Hydrogen exposure time (minutes) | Color | | | |
|---|---|---|---|---|
| | L | a | b | ΔE |
| 0 | 74.1 | 1.3 | 13.6 | — |
| 1 | 58.1 | −0.5 | 1.9 | 19.9 |
| 3 | 55.2 | −0.2 | 0.4 | 23.1 |
| 60 | 55.0 | −0.2 | 0.3 | 23.3 |

TABLE 3

Sample F

| Hydrogen exposure time (minutes) | Color | | | |
|---|---|---|---|---|
| | L | a | b | ΔE |
| 0 | 51.0 | 4.2 | 14.1 | — |
| 1 | 49.1 | 3.5 | 12.5 | 2.6 |
| 3 | 40.6 | 1.7 | 5.8 | 13.5 |
| 60 | 33.2 | 0.0 | −1.6 | 24.1 |

TABLE 4

| Sample | Surface area ($mm^2$) after color change |
|---|---|
| C | 36 |
| F | 9 |

TABLE 5

| Sample | Surface area ($mm^2$) after color change |
|---|---|
| A | 25 |
| B | 33 |
| C | 36 |

TABLE 6

Samples C, G and H

| Sample | Color before $H_2$-exp. | | | Color after $H_2$-exp. For 6-min. | | | |
|---|---|---|---|---|---|---|---|
| | L | a | b | L | a | b | DE |
| C | 74.1 | 1.3 | 13.6 | 55.0 | −0.2 | 0.3 | 23.3 |
| G | 91.4 | 0.0 | 2.3 | 91.6 | 0.0 | 2.3 | 0.2 |
| H | 92.4 | −0.6 | 7.8 | 92.4 | −0.7 | 7.8 | 0.1 |

TABLE 7

Samples A, B and C

| Sample | Color before $H_2$-exp. | | | Color after $H_2$-exp. For 6-min. | | | |
|---|---|---|---|---|---|---|---|
| | L | a | b | L | a | b | DE |
| A | 85.9 | 1.3 | 8.6 | 73.6 | 0.2 | 2.4 | 13.8 |
| B | 81.2 | 1.9 | 9.8 | 65.1 | 0.1 | 1.8 | 18.1 |
| C | 74.1 | 1.3 | 13.6 | 55.0 | −0.2 | 0.3 | 23.3 |

TABLE 8

Samples C and F

| Hydrogen-exposure time (minutes) | Surface area after color change ($mm^2$) | |
|---|---|---|
| | C | F |
| 0 | 0 | 0 |
| 2 | 12 | 0 |
| 5 | 20 | 1 |
| 10 | 25 | 1 |
| 20 | 25 | 4 |
| 30 | 30 | 6 |
| 60 | 36 | 9 |

TABLE 9

Samples A to E

| Amount of Pd (%) | ΔE |
|---|---|
| 0 | 0 |
| 0.25 | 13.8 |
| 0.5 | 18.1 |
| 1.36 | 23.3 |
| 2 | 26.8 |
| 5 | 33.5 |

EXAMPLE 15

The same experiments were repeated on Samples C and F prepared in Example 14 and at the same time another experiment on Sample F was made except that the particles of aluminum oxide ($Al_2O_3$) used had an average particle size of 0.4 μm. The commercial available aluminum oxide particles having the average particle size of 0.4 μm is as close to that of the titanium dioxide particles (0.25 μm) as possible. The samples obtained by these experiments are called Samples C', F' and I, respectively. These samples were subjected to the same test method as the Testing Method used in Example 14. The results are shown in FIGS. 4 and 5 and in below Tables 10–14.

Figure 4:
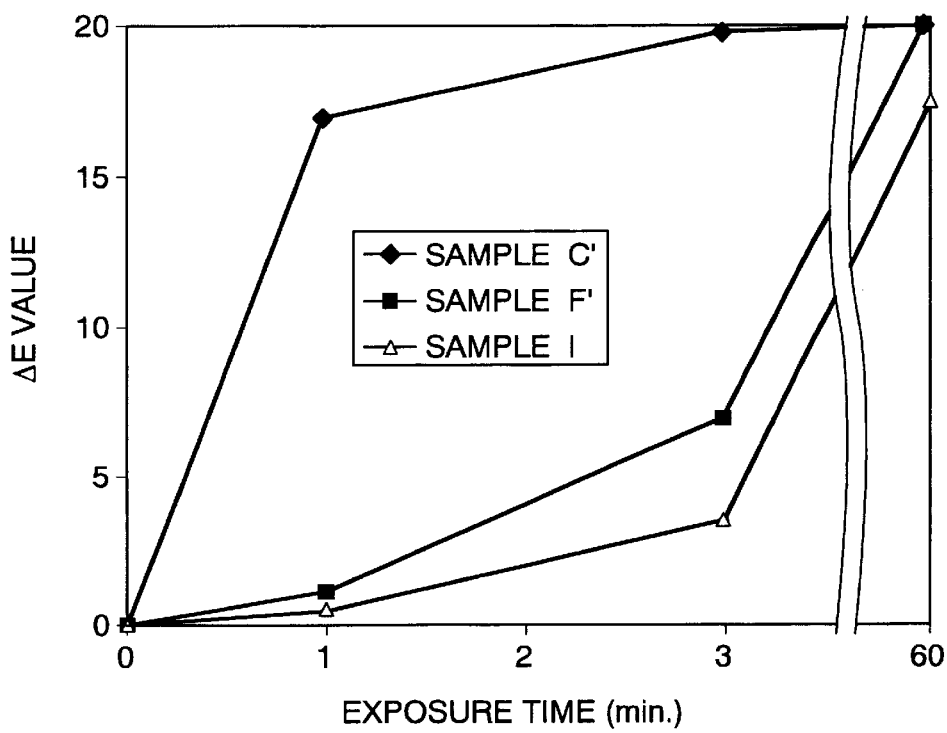
FIG. 4 shows the calculations of $\Delta E$ for Sample C', Sample F' and Sample I, from Test-1 of Example 15.
Figure 5:
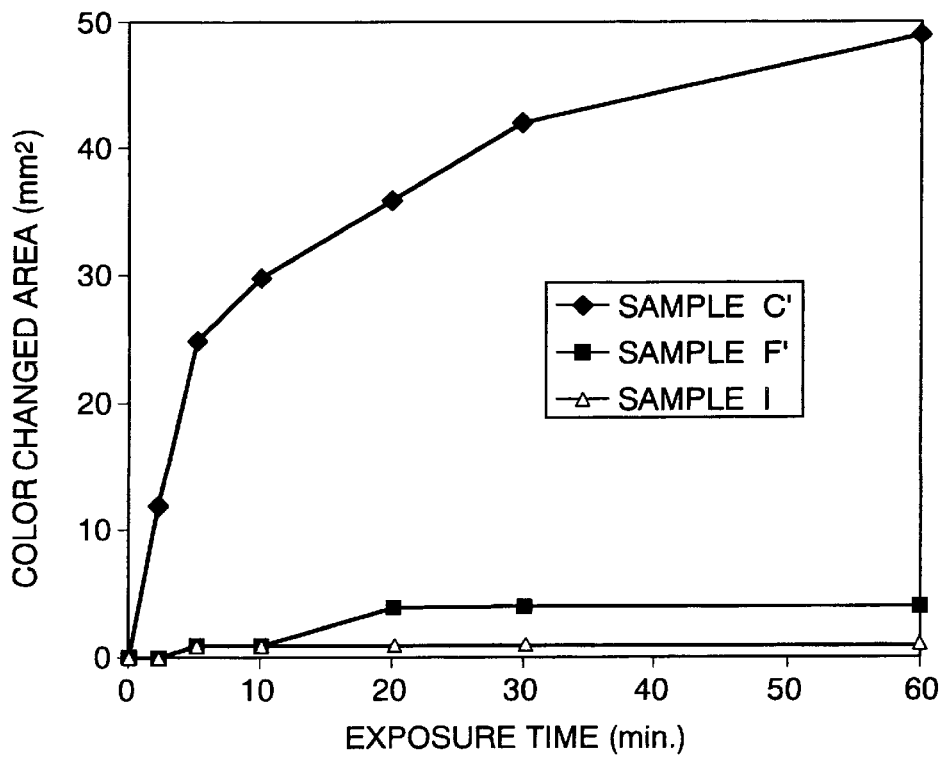
FIG. 5 shows the color-changed surface area for Sample C', Sample F' and Sample I, from Test-2 of Example 15.

FIGS. 4 and 5 show the results of Test-1 and Test-2, respectively. Table 10 shows the results of Test-3. FIG. 4 is numerically shown in Tables 11 to 13. FIG. 5 is numerically shown in Table 14. From the results it is shown that hydrogen gas detectability is decreased as the particle size is reduced. Furthermore, the comparison of the titanium dioxide ($TiO_2$) particles with the $Al_2O_3$ particles, both having almost the same particle size, shows that the $TiO_2$ particles have a better hydrogen gas detectability than that of the $Al_2O_3$ particles.

TABLE 10

| Sample No. | Base | Coated species | Coated amount (%) |
|---|---|---|---|
| C' | $TiO_2$ | PdO | 1.36 |
| F' | $Al_2O_3$ | PdO | 1.36 |
| I | $Al_2O_3$ | PdO | 1.36 |

(Cont'd)

| Colors before change | | | Colors after change | | | |
|---|---|---|---|---|---|---|
| L | a | b | L | a | b | ΔE |
| 75.4 | 2.1 | 11.8 | 59.3 | −0.9 | 0.4 | 20.0 |
| 55.1 | 4.0 | 12.5 | 41.6 | −0.9 | −1.3 | 19.9 |
| 52.2 | 3.2 | 12.4 | 39.6 | −0.6 | 1.0 | 17.4 |

TABLE 11

Sample C'

| Hydrogen exposure time (minutes) | Color | | | |
|---|---|---|---|---|
| | L | a | b | ΔE |
| 0 | 75.4 | 2.1 | 11.8 | — |
| 1 | 61.4 | −0.9 | 1.5 | 16.9 |
| 3 | 59.5 | −1.0 | 0.5 | 19.8 |
| 60 | 59.3 | −0.9 | 0.4 | 20.0 |

TABLE 12

Sample F'

| Hydrogen exposure time (minutes) | Color | | | |
|---|---|---|---|---|
| | L | a | b | ΔE |
| 0 | 55.1 | 4.0 | 12.5 | — |
| 1 | 54.2 | 3.7 | 11.8 | 1.2 |
| 3 | 50.2 | 1.5 | 8.2 | 7.0 |
| 60 | 41.6 | −0.9 | −1.3 | 19.9 |

TABLE 13

Sample I

| Hydrogen exposure time (minutes) | Color | | | |
|---|---|---|---|---|
| | L | a | b | ΔE |
| 0 | 52.2 | 3.2 | 12.4 | — |
| 1 | 51.7 | 3.4 | 12.1 | 0.6 |
| 3 | 49.5 | 2.3 | 10.2 | 3.6 |
| 60 | 39.6 | −0.6 | 1.0 | 17.4 |

TABLE 14

Sample C', F', and I

| Hydrogen exposure time (minutes) | Surface area after color change (mm$^2$) | | |
|---|---|---|---|
| | C' | F' | I |
| 0 | 0 | 0 | 0 |
| 2 | 12 | 0 | 0 |
| 5 | 25 | 1 | 1 |
| 10 | 30 | 1 | 1 |
| 20 | 36 | 4 | 1 |
| 30 | 42 | 4 | 1 |
| 60 | 49 | 4 | 1 |

TEST EXAMPLE

Each 40 g of the Samples obtained in the Examples 1–13 as described above were mixed with 60 g of glass beads and 33.3 g of a resin solution for a mill base which was a mixture of 480 g of TESRACK 2150-50 (Normal dry alkyd resin, available from HITACH Chemical Polymer) and 320 g of mineral turpentine, and thereafter, shaken for 20 minutes to prepare each mill base. To 55 g of each mill base, there were added 85 g of a letdown liquid having the formulation defined below, followed by shaking in a paint shaker for 5 minutes to prepare paints. These paints were applied onto a glass plate to a dry film thickness of 50 μm and dried.

| Formulation of Letdown Liquid | |
|---|---|
| TESRACK 2150-50 (Normal dry alkyd resin, available from HITACH Chemical Polymer Co.) | 78.9 g |
| DISPERON 4200-20 (Dispersant, available from KUSUMOTO Chemical Co.) | 0.9 g |
| Lead naphthenate (available from DAI NIPPON INK Co.) | 3.1 g |
| Cobalt naphthenate (available from DAI NIPPON INK Co.) | 0.6 g |
| Manganese naphthenate (available from DAI NIPPON INK Co.) | 0.6 g |
| Methyl ethyl ketone oxime (available from UBE KOSAN Co.) | 0.9 g |

Colors (L value, a value and b value) of these glass plates were measured with SUGA SM-4 Color computer (available from SUGA Shikenki Co.). Then, the Samples were placed in a 5 liter vessel at room temperature which was swept with hydrogen, and thereafter, colors (L' value, a' value and b' value) of the glass plates after passing a flow of hydrogen for 60 minutes at a rate of 500 ml/minute were measured and calculated for a degree of color change (ΔE) owing to hydrogen using the equation:

$$\Delta E = \{(L-L')^2+(a-a')^2+(b-b')^2\}^{1/2}.$$

The higher ΔE value indicates the larger degree of color change of a pigment formulated. When the ΔE is not less than 15, the color change of the pigment can be visually (and definitely) determined. In particular, the color change of a ΔE of 15 or more can be preferably easily discerned.

The identical tests using carbon monoxide and methane instead of hydrogen resulted in the gas sensing abilities on the same order as those with hydrogen.

Moreover, each paint with the aforementioned formulation was applied onto a panel to a dry film thickness of 50 μm and dried. Then, these panels were placed in a weathermeter and subjected to an accelerated weathering test. After 400 hours, the panels were measured for gloss to determine the gloss retention ratio (weatherability of pigment). The results are shown in Tables 15 and 16.

TABLE 15

|  | Sample | ΔE |
| --- | --- | --- |
| Example 1 | A | 23 |
| Example 2 | B | 25 |
| Example 3 | C | 29 |
| Example 4 | D | 21 |
| Example 5 | E | 19 |

TABLE 16

|  | Sample | ΔE | % Gloss Retention |
| --- | --- | --- | --- |
| Example 6 | F | 23 | 76 |
| Example 7 | G | 23 | 16 |
| Example 8 | H | 23 | 72 |
| Example 9 | I | 23 | 80 |
| Example 10 | J | 25 | 84 |
| Example 11 | K | 21 | 90 |
| Example 12 | L | 23 | 96 |
| Example 13 | M | 25 | 99 |

What is claimed is:

1. A pigment for sensing reducing gas leakage, comprising titanium dioxide particles having deposited thereon at least one compound selected from the group consisting of oxides, hydroxides and hydrated oxides of platinum group metals, said pigment exhibiting a degree of color change, ΔE, of not less than 15, one minute or earlier after contact of said pigment with the reducing gas.

2. A pigment for sensing reducing gas leakage, comprising titanium dioxide particles having deposited thereon at least one compound selected from the group consisting of oxides, hydroxides and hydrated oxides of platinum group metals present on the surface thereof, and additionally having at least one compound selected from the group consisting of oxides, hydroxides and hydrated oxides of aluminum, silicon, titanium, zinc, zirconium, tin, antimony and cerium present on the particles, said pigment exhibiting a degree of color change, ΔE, of at least 15, one minute or earlier after contact of said pigment with the reducing gas.

3. The pigment for sensing reducing gas leakage according to claim 1, in which said titanium dioxide particles have an average particle size of 0.01 to 0.5 μm.

4. A process for producing the pigment for sensing reducing gas leakage as defined in claim 1, comprising the steps of:

adding at least one salt of platinum group metals to a slurry of titanium dioxide particles, neutralizing the resultant mixture to deposit at least one compound of said platinum metals on the surfaces of said particles, separating solids from the slurry, and heat treating the solids.

5. The process for producing the pigment for sensing reducing gas leakage as defined in claim 1, comprising the steps of:

adding at least one salt of platinum group metals and an alkali or an acid to a slurry of titanium dioxide particles while maintaining the pH of the slurry in the range from 3 to 11, to neutralize the resultant mixture, thereby depositing at least one platinum group compound on the surfaces of the particles, and separating solids from the slurry.

6. The process for producing the pigment for sensing reducing gas leakage as defined in claim 1, comprising the steps of:

adding at least one salt of platinum group metals and an alkali or an acid to a slurry of titanium dioxide particles while maintaining the pH of the slurry in the range from 3 to 11, to neutralize the resultant mixture, thereby depositing at least one platinum group compound on the surfaces of said particles, separating solids from the slurry, and heating the solids at a temperature of 250° to 600° C.

7. A process for producing a pigment for sensing reducing gas leakage as defined in claim 2, comprising the steps of:

adding at least one salt of platinum group metals to a slurry of titanium dioxide particles, neutralizing the resultant mixture to deposit at least one of said platinum group compounds on the surfaces of said particles, adding to said slurry at least one compound selected from the group consisting of aluminum, silicon, titanium, zinc, zirconium, tin, antimony and cerium, neutralizing the resultant mixture to deposit at least one oxide, hydroxide or hydrated oxide of aluminum, silicon, titanium, zinc, zirconium, tin, antimony or cerium, on the particles, and separating solids from the slurry.

8. A process for producing a pigment for sensing reducing gas leakage as defined in claim 2, comprising the steps of:

adding at least one salt of platinum group metals to a slurry of titanium dioxide particles, neutralizing the resultant mixture to deposit at least one of said platinum group compounds on the surfaces of said particles, separating solids from the slurry, heating the solids at a temperature of 250° to 600° C. to produce a powder, dispersing said powder into water to produce an aqueous slurry, adding to said aqueous slurry at least one compound selected from the group consisting of aluminum, silicon, titanium, zinc, zirconium, tin, antimony and cerium, neutralizing the resultant mixture to deposit at least one oxide, hydroxide or hydrated oxide of aluminum, silicon, titanium, zinc, zirconium, tin, antimony or cerium, on the particles, and separating solids from the slurry.

9. A method for sensing reducing gas leakage comprising the steps of:

a) preparing a pigment for sensing reducing gas leakage comprising titanium dioxide particles having deposited hereon at least one compound selected form the group consisting of oxides, hydroxides and hydrated oxides of platinum group metals;

b) coating said pigment at a site to be tested for gas leakage; and c) observing a color change, ΔE, of not less than 15, within one minute after contact of said pigment with the reducing gas.

10. A method for sensing reducing gas leakage comprising the steps of:
   a) preparing a pigment for sensing reducing gas leakage comprising titanium dioxide particles having at least one compound selected form the group consisting of oxides, hydroxides and hydrated oxides of platinum group metals present on the surface thereof, and in addition having at least one compound selected from the group consisting of oxides, hydroxides and hydrated oxides of aluminum, silicon, titanium, zinc, zirconium, tin, antimony and cerium present on the particles;
   b) coating said pigment at a site to be tested for gas leakage; and
   c) observing a color change, $\Delta E$, of not less than 15, within one minute after contact of said pigment with the reducing gas.

11. A process for producing the pigment for sensing reducing gas leakage as defined in claim 1, comprising the steps of:
   adding at least one salt of platinum group metals to a slurry of titanium dioxide particles, having an average particle size of 0.01 to 0.5 $\mu$m,
   neutralizing the resultant mixture to deposit at least one compound of said platinum metals on the surfaces of said particles,
   separating solids from the slurry, and
   heat treating the solids.

12. The pigment for sensing reducing gas leakage according to claim 1 or 2, in which said platinum group metal is palladium.

13. A process for producing the pigment for sensing reducing gas leakage as defined in claim 1, comprising the steps of:
   adding at least one salt of palladium to a slurry of titanium dioxide particles,
   neutralizing the resultant mixture to deposit at least one compound of said platinum metals on the surfaces of said particles,
   separating solids from the slurry, and
   heat treating the solids.

14. A process for producing a pigment for sensing reducing gas leakage as defined in claim 2, comprising the steps of:
   adding at least one salt of platinum group metals to a slurry of titanium dioxide particles, having an average particle size of 0.01 to 0.5 $\mu$m,
   neutralizing the resultant mixture to deposit at least one of said platinum group compounds on the surfaces of said particles,
   adding to said slurry at least one compound selected from the group consisting of aluminum, silicon, titanium, zinc, zirconium, tin, antimony and cerium,
   neutralizing the resultant mixture to deposit at least one oxide, hydroxide or hydrated oxide of aluminum, silicon, titanium, zinc, zirconium, tin, antimony or cerium, on the particles, and
   separating solids from the slurry.

15. A process for producing a pigment for sensing reducing gas leakage as defined in claim 2, comprising the steps of:
   adding at least one salt of palladium to a slurry of titanium dioxide particles,
   neutralizing the resultant mixture to deposit at least one of said platinum group compounds on the surfaces of said particles,
   adding to said slurry at least one compound selected from the group consisting of aluminum, silicon, titanium, zinc, zirconium, tin, antimony and cerium,
   neutralizing the resultant mixture to deposit at least one oxide, hydroxide or hydrated oxide of aluminum, silicon, titanium, zinc, zirconium, tin, antimony or cerium, on the particles, and
   separating solids from the slurry.

16. A paint composition, comprising:
   a) a resin as a coating film-forming agent and
   b) a pigment for sensing reducing gas leakage according to either claim 1 or 2.

17. A process for producing the pigment for sensing reducing gas leakage as defined in claim 1, comprising the steps of:
   adding at least one salt of platinum group metals to a slurry of titanium dioxide particles,
   neutralizing the resultant mixture to deposit at least one compound of said platinum metals on the surfaces of said particles, and
   separating solids from the slurry.

18. A pigment for sensing reducing gas leakage, comprising titanium dioxide particles having an average particle size of 0.01 to 0.5 $\mu$m, and having deposited thereon at least one compound, in an amount of 0.5 to 10% by weight in terms of PdO, selected from the group consisting of oxides, hydroxides and hydrated oxides of palladium, said pigment exhibiting a degree of color change, $\Delta E$, of not less than 15, one minute or earlier after contact of said pigment with the reducing gas.

19. A pigment for sensing reducing gas leakage, comprising titanium dioxide particles having an average particle size of 0.01 to 0.5 $\mu$m, and having deposited thereon at least one compound, in an amount of 0.5 to 10% by weight in terms of PdO, selected from the group consisting of oxides, hydroxides and hydrated oxides of palladium present on the surface thereof, and additionally having at least one compound selected from the group consisting of oxides, hydroxides and hydrated oxides of aluminum, silicon, titanium, zinc, zirconium, tin, antimony and cerium present on the particles, said pigment exhibiting a degree of color change, $\Delta E$, of at least 15, one minute or earlier after contact of said pigment with the reducing gas.

* * * * *